United States Patent [19]

Sukimoto et al.

[11] Patent Number: 4,829,944

[45] Date of Patent: May 16, 1989

[54] INTAKE MANIFOLD AND PROCESS FOR PRODUCING SAME

[75] Inventors: Minobu Sukimoto; Katsumi Yamazaki; Naohisa Hirunuma; Seijiro Taguchi; Tadashi Usui; Yasushi Akiyoshi; Toyoichiro Nogami; Toyoji Kaneko, all of Sakai, Japan

[73] Assignee: Showa Aluminum Corporation, Osaka, Japan

[21] Appl. No.: 65,461

[22] Filed: Jun. 23, 1987

[30] Foreign Application Priority Data

| Jun. 25, 1986 | [JP] | Japan | 61-150596 |
| Sep. 30, 1986 | [JP] | Japan | 61-234095 |
| Sep. 30, 1986 | [JP] | Japan | 61-234096 |
| Mar. 24, 1987 | [JP] | Japan | 61-69388 |
| Apr. 22, 1987 | [JP] | Japan | 62-99262 |
| Apr. 24, 1987 | [JP] | Japan | 62-102299 |

[51] Int. Cl.$^4$ ............................................. F02B 75/22
[52] U.S. Cl. ........................... 123/52 M; 123/52 MV
[58] Field of Search ..................... 123/52 M, 52 MV

[56] References Cited

U.S. PATENT DOCUMENTS

| 4,372,120 | 2/1983 | Ford et al. | 123/52 M |
| 4,515,115 | 5/1985 | Okubo | 123/52 M |
| 4,608,948 | 9/1986 | Inoue et al. | 123/52 M |
| 4,643,137 | 2/1987 | Choushi et al. | 123/52 M |
| 4,686,944 | 8/1987 | Hiraoka et al. | 123/52 MV |

Primary Examiner—Willis R. Wolfe
Assistant Examiner—M. Macy
Attorney, Agent, or Firm—Armstrong, Nikaido Marmelstein & Kubovcik

[57] ABSTRACT

An intake manifold comprising a main pipe made of wrought aluminum material and having an open end, a closed end opposite to the open end, a plurality of holes formed in its peripheral wall and outward tubular projections integral with the peripheral wall and each formed around each of the holes, and a plurality of branch pipes made of wrought aluminum material and each having one end fitting in and joined to each of the tubular projections. The manifold is smooth-surfaced in its interior, diminished in resistance to air and improved in air intake efficiency. The manifold requires no finishing procedure unlike those prepared by casting.

9 Claims, 7 Drawing Sheets

INTAKE MANIFOLD AND PROCESS FOR PRODUCING SAME

BACKGROUND OF THE INVENTION

The present invention relates to intake manifolds, for example, for use in motor vehicle gasoline engines equipped with an electronically controllable fuel injection system.

The term "aluminum" as used herein and in the appended claims includes pure aluminum, commercial aluminum containing a small amount of impurities and aluminum alloys. Further the term "wrought aluminum material" as used herein and in the appended claims includes products prepared by plastic working.

Intake manifolds have heretofore been prepared entirely by casting for use in motor vehicle gasoline engines equipped with an electronically controllable fuel injection system. However, since the cast product has a rough surface, the conventional intake manifold must be made smooth-surfaced at least in its interior by a cumbersome finishing procedure in order to assure diminished air resistance and thereby achieve an improved air intake efficiency. Further it is impossible to finish the entire interior surface of the intake manifold because of its configuration and therefore to fully reduce the air resistance for efficient air intake. Moreover, there is a limitation to the reduction of its weight.

SUMMARY OF THE INVENTION

An object of the present invention is to overcome these problems and to provide an intake manifold which is diminished in resistance to the flow of air therethrough and improved in air intake efficiency.

Another object of the invention is to provide an intake manifold which is internally smooth-surfaced and need not be smoothened for finishing.

Still another object of the invention is to provide an intake manifold having a smaller weight than conventional cast intake manifolds.

The present invention provides an intake manifold which comprises a main pipe made of wrought aluminum material and having an open end, a closed end opposite to the open end, a plurality of holes formed in its peripheral wall and outward tubular projections integral with the peripheral wall and each formed around each of the holes, and a plurality of branch pipes made of wrought aluminum material and each having one end fitting in and joined to each of the tubular projections. Since the main pipe and the branch pipes are made of wrought aluminum material, the intake manifold is more smooth-surfaced in its interior, lower in resistance to air and higher in air intake efficiency than the conventional intake manifold which is entirely prepared by casting. Moreover, the present intake manifold does not always require a finishing procedure unlike the conventional one and can be made more lightweight than the conventional cast product.

The intake manifold can be produced by a process comprising the steps of preparing a main pipe blank made of wrought aluminum material and having an open end and a closed end opposite to the open end and a plurality of branch pipes made of wrought aluminum material and having opposite open ends; forming in the peripheral wall of the main pipe blank holes equal in number to the number of the branch pipes; forming outward projections integrally with the peripheral wall individually around each of the holes, the tubular projections being identical with the branch pipes in inside diameter; forming an enlarged tubular portion at the forward end of each of the tubular projections, the enlarged tubular portion having an inside diameter larger than the outside diameter of the branch pipes; forming on the outer peripheral surface of one end of each branch pipe a plurality of outer protuberances equal in projection height and arranged at a spacing circumferentially thereof so that when the above-mentioned one end of the branch pipe is fitted in the enlarged tubular portion, the protuberances are in contact with the inner peripheral surface of the enlarged tubular portion to form a brazing material retaining clearance between the inner peripheral surface and the outer peripheral surface; and fitting the above-mentioned one end of each branch pipe into the enlarged tubular portion in alignment therewith and joining the branch pipe end to the enlarged tubular portion by brazing.

Alternatively, the intake manifold is produced by a process comprising the steps of preparing a main pipe blank made of wrought aluminum material and having an open end and a closed end opposite to the open end and branch pipes made of wrought aluminum material and having opposite open ends; forming a plurality of holes in the peripheral wall of the main pipe blank; forming outward tubular projections integrally with the peripheral wall individually around each of the holes, the tubular projections being identical with the branch pipes in inside diameter; forming a first enlarged tubular portion at the forward end of each of the tubular projections and a second enlarged tubular portion for retaining a brazing material at the forward end of the first portion integrally therewith, the second portion being larger than the first portion in inside diameter; and fitting one end of each of the branch pipes into the first enlarged tubular portion in alignment therewith and joining the branch pipe to the tubular projection by brazing.

Further according to another feature of the invention, the intake manifold comprises a cast aluminum member having a bore extending therethrough and fixed to the open end of the main pipe inserted in the bore. The cast aluminum member is fixed to the main pipe by brazing, more specifically by removing a surface coating from the joint portion to be formed and exposed to a brazing material and including the bore-defining inner peripheral surface of the member and the main pipe inserting end face thereof to form a clean surface and also removing a surface coating from a specified area of the non-joint portion of the member to be held out of contact with the brazing material after brazing and continuous with the joint portion; inserting the open end of the main pipe into the bore of the member; and placing the brazing material in contact with the main pipe inserting end face of the member at the portion thereof around the opening of the bore and with the outer periphery of the main pipe and bonding the member to the main pipe by brazing. Alternatively, the cast aluminum member is fixed to the main pipe by forming a brazing material retaining annular recess in the main pipe inserting end face of the member along the entire peripheral edge thereof defining the bore opening; removing a surface coating from the joint portion to be formed and exposed to the brazing material of the bore-defining inner peripheral surface of the member and from the recess-defining inner peripheral surface thereof to form a clean surface; inserting the open end of the main pipe into the bore of the member; and placing the brazing material in the recess of the member and bonding the member to the main pipe by brazing. The cast aluminum member can be reliably bonded to the main pipe which is made of wrought aluminum material by either of these processes without any fault.

The present invention will be described below in greater detail with reference to the accompanying drawings.

DESCRIPTION OF THE PREFERRED EMBODIMENTS

Figure 1:
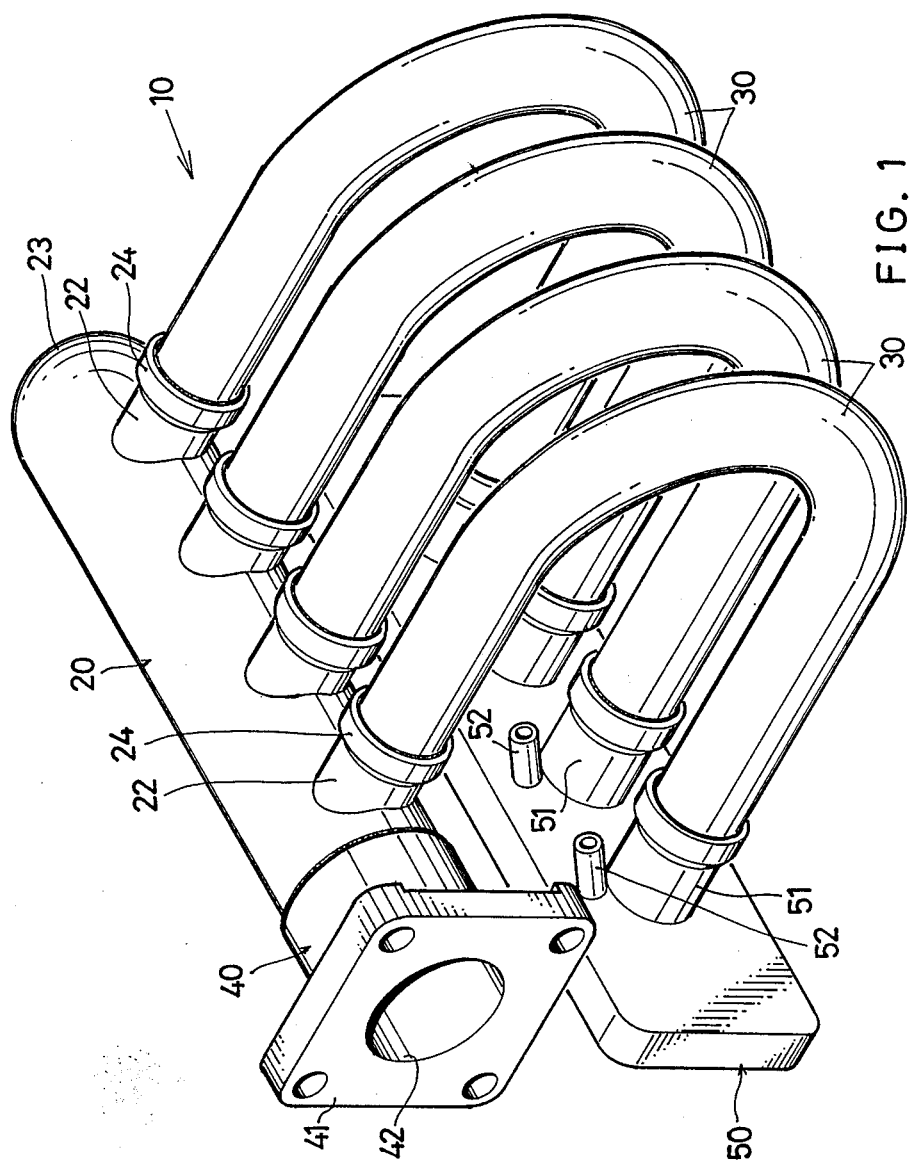
FIG. 1 is a perspective view showing an intake manifold embodying the invention.
Figure 2:
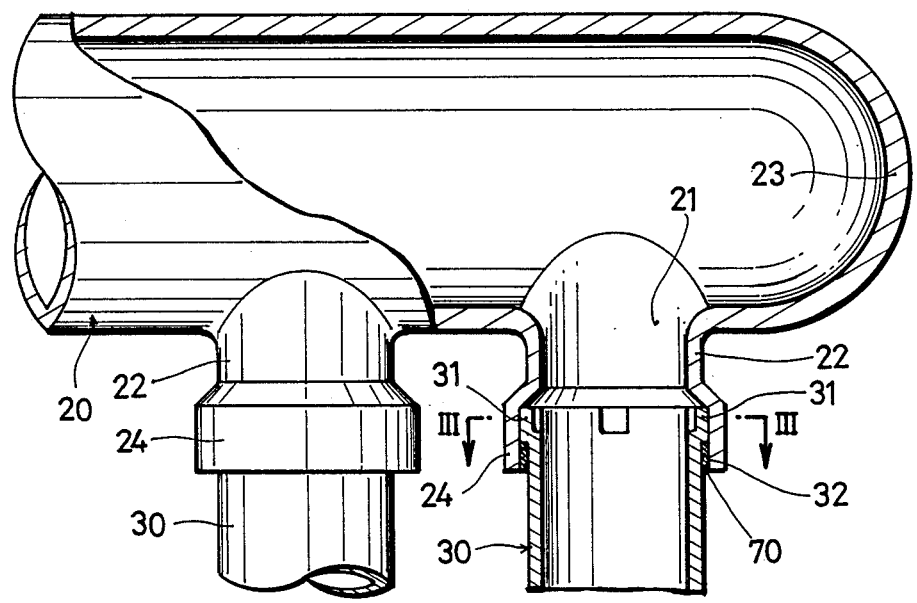
FIG. 2 is a fragmentary plan view partly broken away and showing the manifold.
Figure 3:
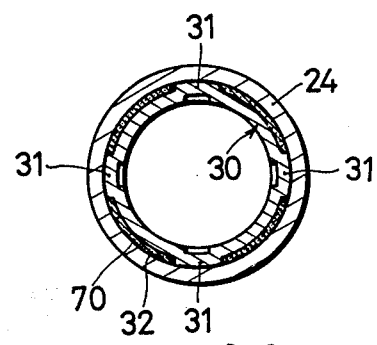
FIG. 3 is a view in section taken along the line III—III in FIG. 2.

With reference to FIGS. 1 to 3 showing an intake manifold 10 embodying the invention, the manifold 10 comprises a main pipe 20 made of wrought aluminum material and having an open end, a closed end opposite to the open end, a plurality of holes 21 formed in its peripheral wall and outward tubular projections 22 integral with the peripheral wall and each formed around each of the holes 21, and a plurality of branch pipes 30 made of wrought material and each having one end fitting in and joined to each of the tubular projections 22. A throttle body 40 in the form of a cast aluminum member is fixedly joined to the open end of the main pipe 20. An air duct from an unillustrated air cleaner is connected to the throttle body 40. The other ends of the branch pipes 30 are collectively connected to a support flange 50, via which the branch pipes 30 communicate with the respective cylinder heads of an unillustrated engine.

The closed end of the main pipe 20 has an outwardly bulging semispherical closing wall 23 having a concave spherical inner surface, which produces a muffling effect. The tubular projection 22 is identical with the branch pipe 30 in inside diameter. An enlarged tubular portion 24 having an inside diameter larger than the outside diameter of the branch pipe 30 is formed at the forward end of each tubular projection 22 integrally therewith.

Figure 4:
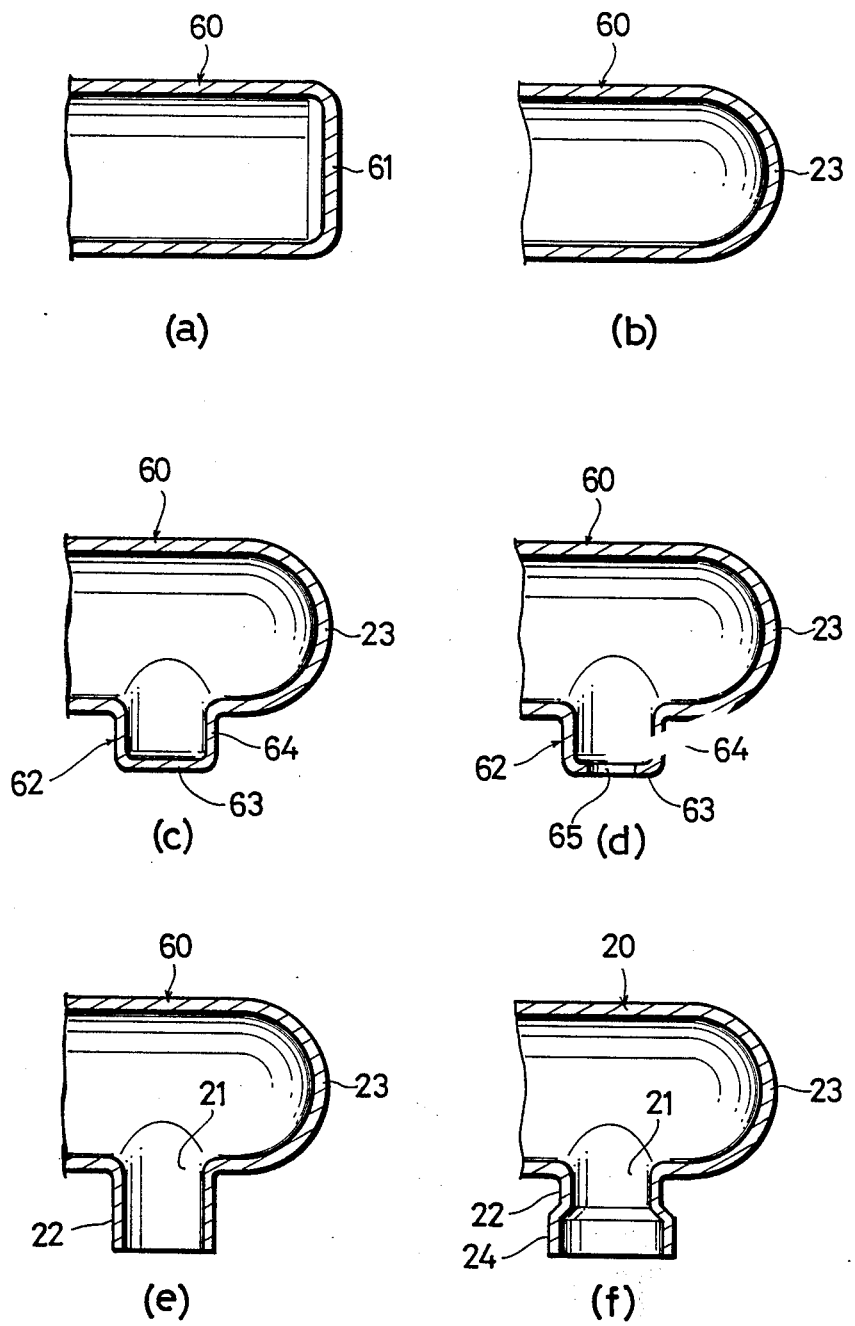
FIGS. 4a-4f show a process for preparing a main pipe stepwise.

The main pipe 20 is prepared from a wrought aluminum material, e.g., an extrusion pipe or an impact extrusion pipe. FIG. 4 (a) shows such an impact extrusion pipe 60 which is open at one end and closed at the other end. To prepare the main pipe 20 from this pipe 60, the closing wall 61 of the pipe 60 is pressed into the outwardly bulging semispherical closing wall 23 as seen in FIG. 4 (b). Next as seen in FIG. 4 (c), the peripheral wall of the pipe 60 is bulged at the portion thereof to be connected to each branch pipe 30 to form a tubular protrusion 62 having a forward end closed with a wall 63. A hole 65 is then formed in the end closing wall 63 of the protrusion 62 centrally thereof except at its peripheral edge portion as shown in FIG. 4 (d). Subsequently as seen in FIG. 4 (e), the remaining portion of the wall 63 defining the hole 65 is outwardly bent flush with the peripheral wall 64 by burring, whereby the protrusion 62 is made into the tubular projection 22, with the hole 21 formed in the peripheral wall of the main pipe. The enlarged tubular portion 24 is formed by diametrically enlarging the forward end of the projection 22 as seen in FIG. 4 (f). Finally, the enlarged tubular portion 24 is sized with a sizing tool to give accurately circular cross-sectional inner and outer two contours to the portion 24.

Figure 5:
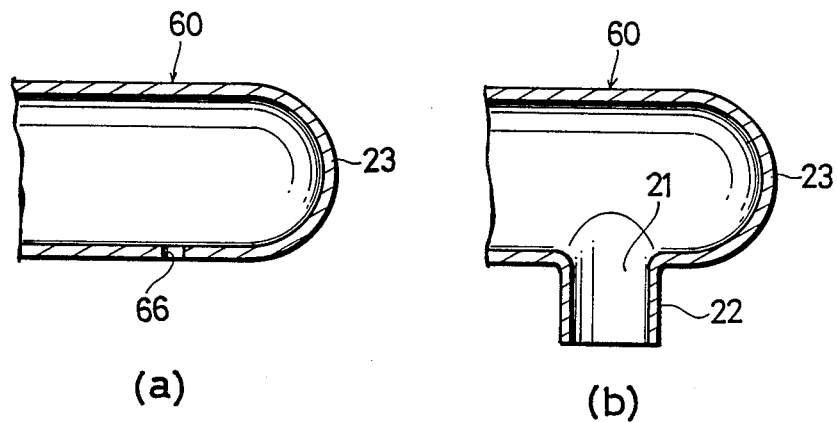
FIGS. 5a and 5b show another process for preparing the main pipe stepwise.

Alternatively, the main pipe 20 is prepared from a pipe 60 by the following process. After the closing wall 61 of the pipe 60 has been pressed into a semispherical form in the same manner as above, a hole 66 smaller than the hole 21 is formed in the peripheral wall of the pipe 60 at the portion thereof to be connected to each branch pipe 30 as seen in FIG. 5 (a). Next, the portion around the hole 66 is outwardly bent by burring to form the tubular outward projection 22 and the hole 21 as shown in FIG. 5 (b). The enlarged tubular portion 24 is thereafter formed in the same manner as above, and the portion 24 is finally sized.

When the main pipe 20 is to be prepared from an extruded aluminum pipe, one of the open ends of the extruded pipe is closed, and the same steps as above are thereafter performed.

Each branch pipe 30 is connected at its one end to the main pipe 20 by fitting the end into the enlarged tubular portion 24 at the outer end of the projection 22 in alignment therewith, and bonding the pipe end to the tubular portion 24 by brazing. The branch pipe 30 is formed on the outer peripheral surface of the above-mentioned one end with protuberances 31 which are equal in projection height, in contact with the inner peripheral surface of the tubular portion 24 and arranged at a given spacing circumferentially thereof. The branch pipe 30 is aligned with the tubular projection 22 by these protuberances 31, which also form between the inner peripheral surface of the enlarged tubular portion 24 and the outer peripheral surface of the branch pipe 30 a clearance 32 filled with a brazing material 70.

The branch pipe 30 is prepared from a wrought aluminum material, e.g., an extruded pipe, by bending the extruded pipe to the shape of a hairpin, sizing the opposite ends with a sizing tool to give accurately circular inner and outer two contours to each end in cross section, and thereafter forming the protuberances 31 by dimpling on the peripheral wall of the end to be connected to the main pipe 20.

Preferably, the main pipe 20 and the branch pipes 30 are made of an aluminum material of AA6000 series, such as AA6063 or AA6061, which comprises 0.35 to 1.5 wt. % Mg, 0.20 to 1.2 wt. % Si, and the balance aluminum and inevitable impurities, because if the Mg content is less than the above lower limit, insufficient strength will result, whereas when the content is over the upper limit, the material is likely to be inferior in extrudability, workability and amenability to brazing. Further if the Si content is less than the lower limit, insufficient strength is likely to result, whereas if it is above the upper limit, the material is liable to exhibit poor extrudability and lower workability. While the aluminum materials for use in preparing wrought materials include, besides those of AA6000 series, aluminum materials of AA1000 series, AA2000 series, AA3000 series, AA5000 series and AA7000 series, the materials other than those of AA6000 series have the following drawbacks. Aluminum materials of AA2000 series are low in corrosion resistance and workabilities such as hot extrudability, forgeability and bendability. Those of AA5000 series have good corrosion resistance but are low in hot extrudability, forgeability, bendability and like workabilities and poor in amenability to brazing. Those of AA7000 series are low in resistance to stress corrosion cracking and workabilities such as hot extrudability, forgeability and bendability. Further aluminum materials of AA1000 series and AA3000 series are inferior to those of AA6000 series in mechanical strength after brazing. Examples of such materials are compared in the following table in respect of properties.

| Property | Kind of material | | |
| --- | --- | --- | --- |
| | AA6063 | AA3003 | AA1100 |
| Hot extrudability | E | E | E |
| Workability | E | E | E |
| Amenability to brazing | G | E | E |
| Mechanical strength | E | P | VP |
| Forgeability | E | E | E |
| Internal surface smoothness after shaping | E | E | E |

In the above table, the term "workability" refers to amenability to bulging, burring and bending. The symbols listed stand for the following: E for excellent, G for good, P for poor and VP for very poor. More specifically stated with respect to "mechanical strength" which means the tensile strength of brazed joints, P stands for a tensile strength of 80 and VP for a tensile strength of 60 when the tensile strength represented by E is 100.

Figure 7:
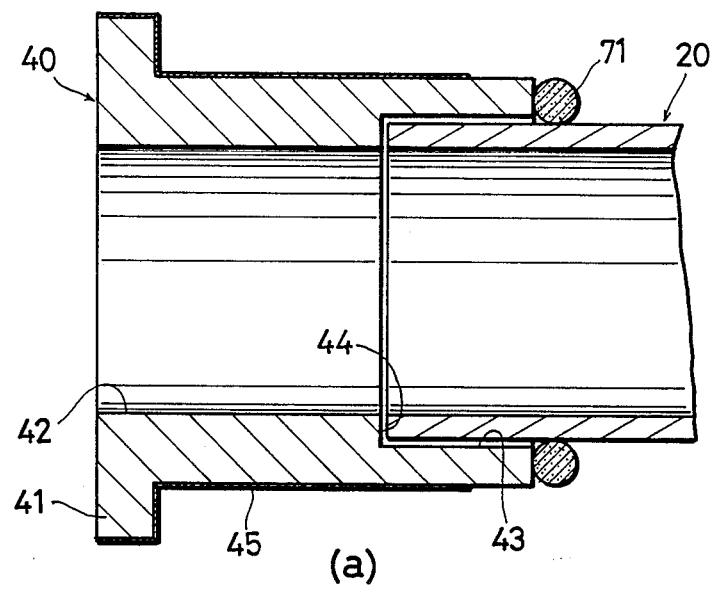
FIGS. 7a and 7b show how to fix a throttle body to the main pipe stepwise.
Figure 7:
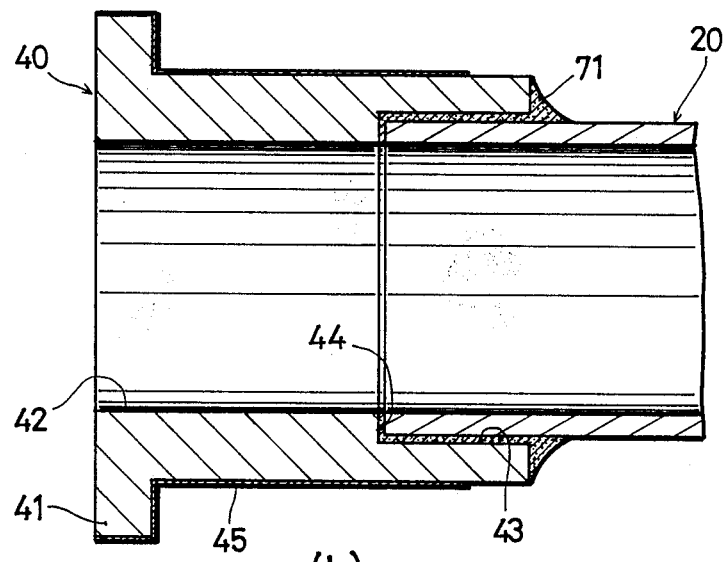

The throttle body 40 is in the form of a tube of circular cross section having a bore 42 extending therethrough and integrally formed with an outwardly projecting flange 41 at its one end. As shown in detail in FIG. 7, the bore 42 has at the other end of the body 40 a large-diameter portion 43. Except for the large-diameter portion 43, the bore 42 has a diameter identical with the inside diameter of the main pipe 20. The large-diameter portion 43, which is formed over a specified length, has a diameter slightly larger than the outside diameter of the main pipe 20. Since the throttle body 40 is a cast product, a surface coating 45 containing oxides and pollutants is present on the surface of the body 40 as cast. The surface coating 45 has been removed from the opposite end faces of the throttle body 40, the inner peripheral surface of the body 40 defining the entire bore 42 including the large-diameter portion 43, the surface of the step 44 between the portion 43 and the other portion of the bore 42, and a portion having a specified width of the outer peripheral surface of the body 40 at the main pipe inserting end thereof. Although not shown, a throttle valve is disposed in the throttle body 40. The open end of the main pipe 20 is inserted in the large-diameter portion 43 of the body 40 at the above-mentioned other end thereof opposite to its flanged end. A brazing material 71 is provided in contact with the main pipe inserting end face of the throttle body 40 and with the outer periphery of the main pipe 20, and is also provided between the large-diameter portion defining inner peripheral surface of the body 40 and the outer peripheral surface of the main pipe 20, and between the step 44 and the end face of the pipe 20 opposed thereto. The throttle body 40 is prepared by casting a blank having no large-diameter portion 43, forming the portion 43 and the step 44 by cutting and thereafter removing the surface coating 45 from the above-mentioned end faces, bore-defining inner surface and outer surface specified area.

The support flange 50 is made of wrought aluminum material or cast aluminum. The support flange 50 is in the form of a horizontally elongated rectangle and has four holes (not shown) and tubular projections 51 integral with the flange body and individually provided around each of the holes for connection to the branch pipes 30. Above each hole, the support flange 50 has a smaller hole (not shown) and is integrally formed with an insertion tube 52 of an unillustrated fuel injection system, around the small hole, the tube 52 projecting in the same direction as the projection 51. The branch pipe 30 is inserted in and brazed to the projection 51.

The intake manifold is produced by the following process.

Prepared for the fabrication of the manifold are a main pipe 20 having four holes 21 and four tubular projections 22 each having an enlarged tubular portion 24, four branch pipes 30 having protuberances 31 and each in the form of a hairpin, a throttle body 40 having a flange 41 and a bore 42 including a large-diameter portion 43, and a support flange 50 having holes, projections 51, smaller holes and tubes 52. The open end of the main pipe 20 and the opposite ends of the branch pipes 30 are then cleaned. As already stated, the surface coating 45 is removed from the joint portion of the throttle body 40 to be formed and exposed to a brazing material 71 and including the main pipe inserting end face thereof, the large-diameter portion defining inner peripheral surface thereof and the step surface 44, and also from the non-joint portion of the body 40 to be held out of contact with the brazing material 71 even after brazing and including a specified area of the outer peripheral surface of the body 40 and the bore defining inner peripheral surface thereof. The surface coating 45 is removed from the non-joint portion, i.e. the specified portion of the outer peripheral surface of the body 40 for the following reason. If the surface coating 45 is not removed from the outer surface of the body 40 at the main pipe inserting end thereof, the brazing material melted during brazing spreads to and reaches the outer peripheral edge of the inserting end face of the throttle body 40, with the result that the melt flows in between the surface coating 45 on the body outer periphery and the ground structure owing to capillarity. This results in the likelihood that an insufficient amount of brazing material will flow into the joint clearance between the main pipe 20 and the throttle body 40, i.e., between the outer periphery of the main pipe 20 and the inner periphery of the body defining the large-diameter portion 43 and between the end face of the main pipe 20 and the step 44, possibly producing a faulty brazed joint. This phenomenon appears attributable to a capillary penetrating force acting between the surface coating on the casting and the ground layer which is greater than that acting between the large-diameter portion defining inner periphery and the main pipe outer periphery, as well as between the step 44 and the main pipe end face. When the surface coating is removed from the outer peripheral surface of the throttle body 40 as stated above, the brazing material melting during brazing, even if spreading to the outer peripheral edge of the main pipe inserting end face of the throttle body 40, does not further spread over the outer peripheral surface of the body 40. Consequently, the melt flows into the joint clearance through capillary penetration, forming a satisfactory brazed joint. The coating is removable mechanically using a grinder, file, brush or the like, or electrochemically, or otherwise.

Figure 6:
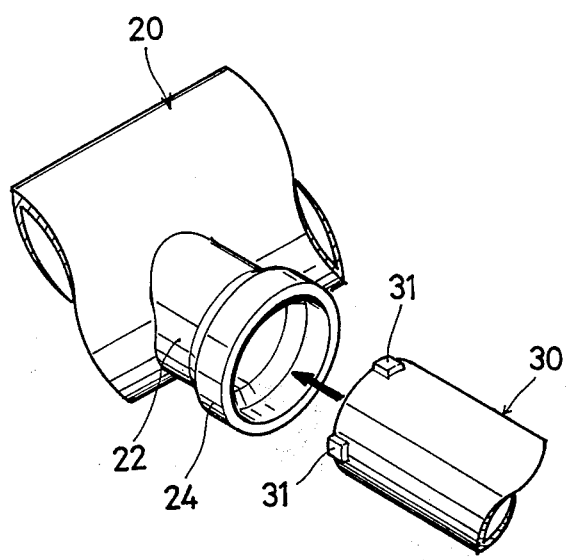
FIG. 6 shows the main pipe and a branch pipe before they are joined together.

Next, the branch pipes 30 are inserted, each at its one end, into the enlarged tubular portions 24 at the outer ends of the respective projections 22 as seen in FIG. 6. A brazing material 70 is placed in contact with the branch pipe inserting end face of each enlarged tubular portion 24 and with the outer periphery of each branch pipe 30. The open end of the main pipe 20 is inserted into the large-diameter portion 43 of the throttle body 40, and a brazing material 71 is placed in contact with the main pipe inserting end face of the body 40 and with the outer periphery of the main pipe 20 (see FIG. 7 (a)). A flux (not shown) is thereafter applied to the brazing materials 70, 71. The parts are joined together by brazing in a furnace. At this time, the branch pipes 30 are also bonded to the support flange 50 by brazing. When the support flange 50 is made of wrought aluminum material, each projection 51 is shaped identically with the tubular projection 22 having the enlarged tubular portion 24, and the same protuberances as the protuberances 31 are formed on the outer periphery of the end of each branch pipe 30 to be joined to the flange 50 to form the same brazed joint as the joint between the main pipe 20 and the branch pipe 30. When the support flange 50 is an aluminum casting, the bore inside the projection 51 is shaped identically with the bore 42 in the throttle body 40 having the large-diameter portion 43, and the surface coating is removed from the required portions as is the case with the body 40 to form the same brazed joint as the joint between the main pipe 20 and the throttle body 40.

The method of forming the brazed joints between the main pipe 20 and the branch pipes 30, between the main pipe 20 and the throttle body, and between the branch pipes 30 and the support flange 50 is not limited to the method described above, but other known brazing methods are usable.

Figure 8:
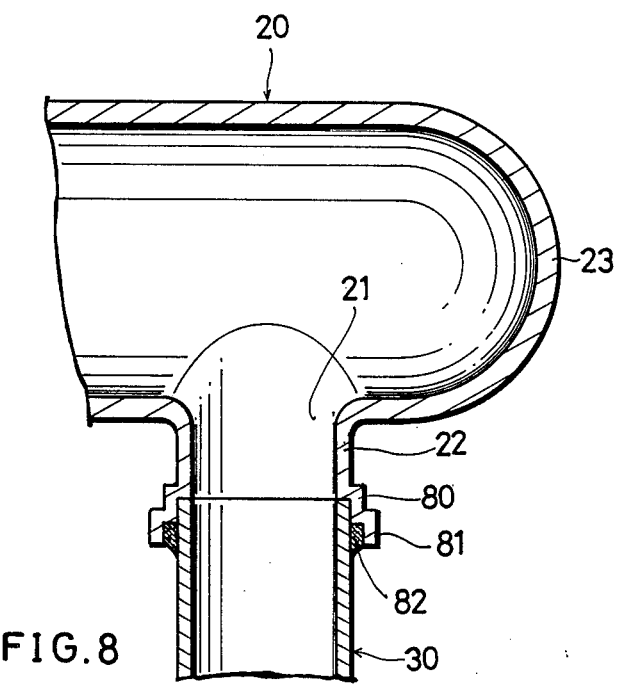
FIG. 8 is a view showing another mode of connection between the main pipe and the branch pipe according to the invention, the view being in section along a plane containing the axes of the two pipes.

With reference to FIG. 8 showing another embodiment of the invention, the tubular projection 22 of the main pipe 20 is formed at its forward end with two enlarged tubular portions 80 and 81 which differ in inside diameter, unlike the single tubular portion 24 of the first embodiment. The first enlarged tubular portion 80, which is integral with the projection 22, is adapted for receiving the end of the branch pipe 30 and has an inside diameter approximately equal to the outside diameter of the branch pipe 30. The second enlarged tubular portion 81, which is integral with the first portion 80, is adapted to retain a brazing material 80 therein and has a larger inside diameter than the first portion 80. The present embodiment further differs from the first embodiment in that the end of the branch pipe 30 to be joined to the main pipe 20 is provided with none of the protuberances 31 on its outer periphery. The branch pipe 30 is brazed to the main pipe 20 by fitting the branch pipe end into the first enlarged tubular portion 80 in alignment therewith, placing the brazing material 82 into the second enlarged tubular portion 81 and heating the assembly.

Figure 9:
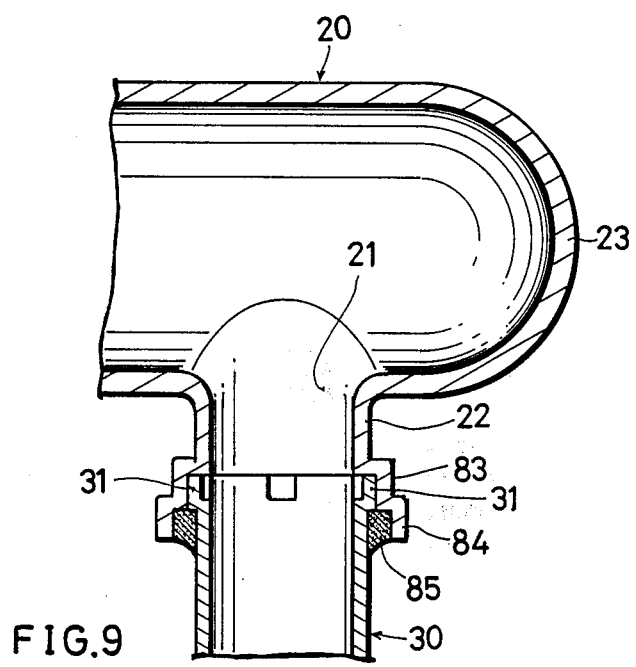
FIG. 9 is a view similar to FIG. 8 and showing another embodiment of the invention.

With reference to FIG. 9 showing another embodiment of the invention, the tubular projection 22 of the main pipe 20 is integral with a first enlarged tubular portion 83 having an inside diameter which is equal to the outside diameter of the branch pipe 30 plus twice the projection height of the protuberance 31. Integral with the first portion 83 is a second enlarged tubular portion 84 having a larger inside diameter than the first portion 83. The brazing material applied is accommodated inside the second portion 84 and also in the clearance between the inner periphery of the first portion 83 and the outer periphery of the branch pipe 30 except where the protuberances 31 are present. In this embodiment, the branch pipe 30 is brazed to the main pipe 20 in the same manner as in the embodiment of FIG. 8.

Figure 10:
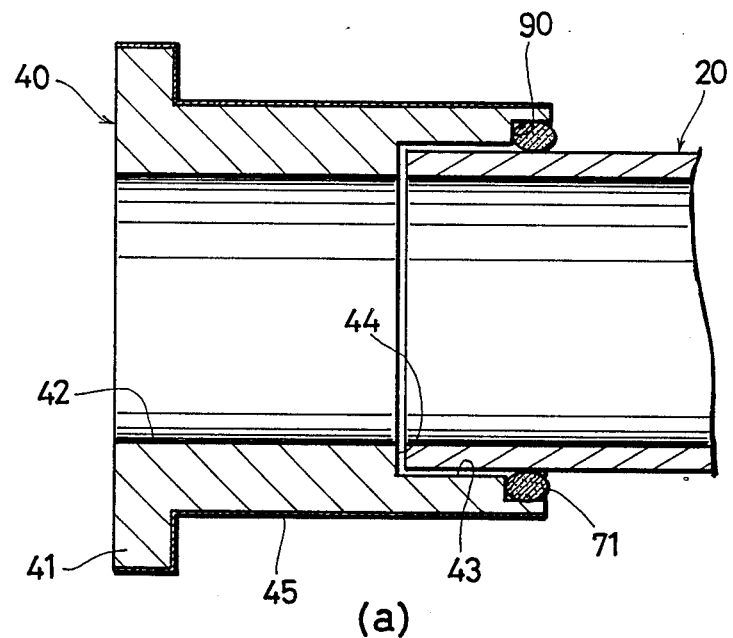
FIGS. 10a and 10b show another mode of connection between the main pipe and the throttle body embodying the invention, the two members being shown in section along a plane containing the axes thereof.
Figure 10:
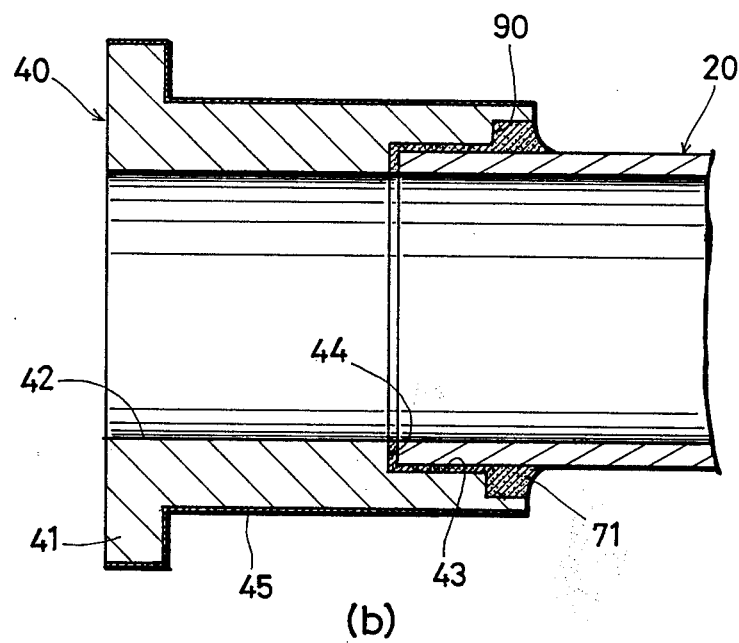

With reference to another embodiment of the invention, an annular recess 90 for retaining a brazing material 71 is formed in the main pipe inserting end face of the throttle body 40 along the entire peripheral edge thereof defining the opening of the bore 42. The inner peripheral surface of the recessed portion 90 is free from the surface coating which is present on the product as cast. In this feature, the present embodiment differs from the first embodiment already described. The present embodiment further differs from the first in that no portion of the surface coating 45 on the outer peripheral surface of the throttle body 40 is removed. The brazing material 71 is accommodated in the recess 90 and is also provided between the inner surface of the body 40 defining the large-diameter portion 43 and the outer periphery of the main pipe 20 and between the step 44 and the end face of the main pipe 20 (see FIG. 10 (b)). The throttle body 40 is prepared by casting a blank having neither of the large-diameter portion 43 and the recess 90, cutting the blank to form these portions 43 and 90 and removing the surface coating from the end faces and the inner peripheral surface defining the bore 42. The throttle body 40 is brazed to the main pipe 20 by fitting the open end of the main pipe 20 into the large-diameter portion 43, then placing the blazing material 71 into the recess 90 as seen in FIG. 10 (a) and heating the assembly. In this case, there is no likelihood that the molten brazing material will overflow the recessed portion 90 and reach the outer peripheral edge of the main pipe inserting end face of the throttle body. Consequently, the melt does not flow in between the surface coating 45 on the outer periphery of the body 40 and the ground layer but flows into the joint clearance through capillary penetration, forming a satisfactory brazed joint.

The present invention may be embodied differently without departing from the spirit and basic features of the invention. Accordingly the embodiments herein disclosed are given for illustrative purposes only and are in no way limitative. It is to be understood that the scope of the invention is defined by the appended claims rather than by the specification and that all alterations and modifications within the definition and scope of the claims are included in the claims.

What is claimed is:

1. An intake manifold comprising a tubular main pipe made of a wrought aluminum material and having an open end, a closed end opposite to the open end, a plurality of holes formed in its peripheral wall and outward tubular projections integral with the peripheral wall and each formed around each of the hole,, and a plurality of branch pipes made of a wrought aluminum material and each having one end fitting in and joined to each of the tubular projections.

2. An intake manifold as defined in claim 1 wherein the main pipe and the branch pipes are made of an aluminum material of AA6000 l series.

3. An intake manifold as defined in claim 1 wherein the main pipe is an aluminum pipe produced by impact extrusion.

4. An intake manifold as defined in claim 1 wherein the closed end of the main pipe is closed with a wall having a concave spherical inner surface.

5. An intake manifold as defined in claim 1 wherein the branch pipes are aluminum pipes produced by extrusion.

6. An intake manifold as defined in claim 1 wherein each of the branch pipes has its one end joined to the tubular projection by brazing as fitted therein.

7. An intake manifold as defined in claim 1 wherein each of the tubular projections is prepared by bulging the peripheral wall of a main pipe blank at the portion thereof to be connected to the branch pipe to form a tubular protrusion having a closed end, forming a hole in the end closing wall of the protrusion except at its peripheral edge portion and outwardly bending the remaining peripheral portion by burring.

8. An intake manifold as defined in claim 1 wherein each of the tubular projections is prepared by forming a hole in the peripheral wall of a main pipe blank at the portion thereof to be connected to the branch pipe and outwardly bending the hole defining portion of the wall by burring.

9. An intake manifold comprising:
a main pipe made of a tubular wrought aluminum material and having an open end, a closed end opposite to the open end, a plurality of holes formed in its peripheral wall and outward tubular projections integral with the peripheral wall and each formed around each of the holes;
a plurality of branch pipes made of a wrought aluminum material and each having one end fitting in and joined to each of the tubular projections, and
a cast aluminum member having a bore extending therethrough and fixed to the open end of the main pipe with said open end of said main pipe inserted in the bore.

* * * * *

UNITED STATES PATENT AND TRADEMARK OFFICE
CERTIFICATE OF CORRECTION

PATENT NO. : 4,829,944

DATED : May 16, 1989

INVENTOR(S) : SUKIMOTO et al

It is certified that error appears in the above-identified patent and that said Letters Patent is hereby corrected as shown below:

On the cover page, Item [75], line 4, "Yasushi Akiyoshi" should read --Hitoshi Akiyoshi--.

Signed and Sealed this

Fifth Day of December, 1989

Attest:

JEFFREY M. SAMUELS

*Attesting Officer*     *Acting Commissioner of Patents and Trademarks*